June 27, 1961
H. P. KALLMANN
2,990,473
METHOD FOR RECORDING, DETECTING AND MEASURING RADIATION
AND FOR RECORDING AND RECALLING DATA
Filed May 4, 1955
2 Sheets-Sheet 1
FIG. IA.
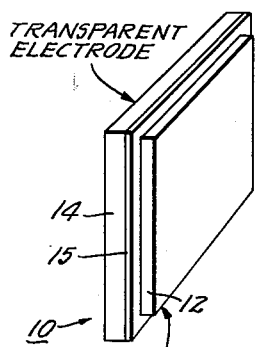
FIG. IB.
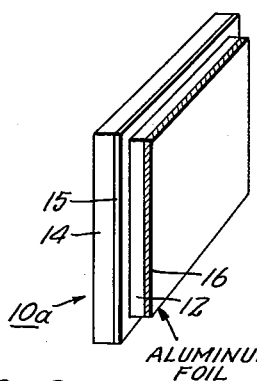
FIG. IC.
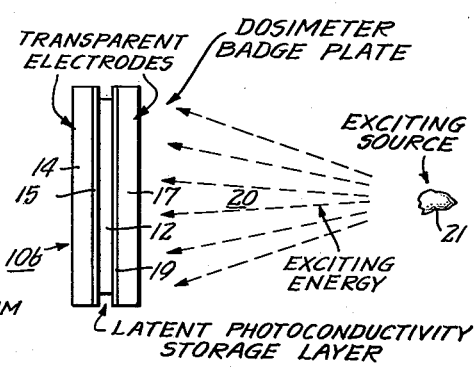
FIG. 2.
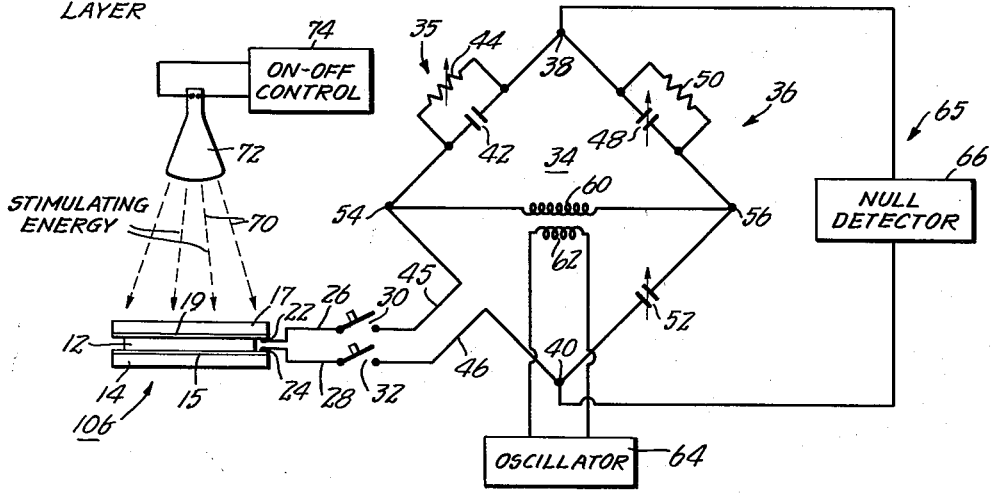
FIG. 3.
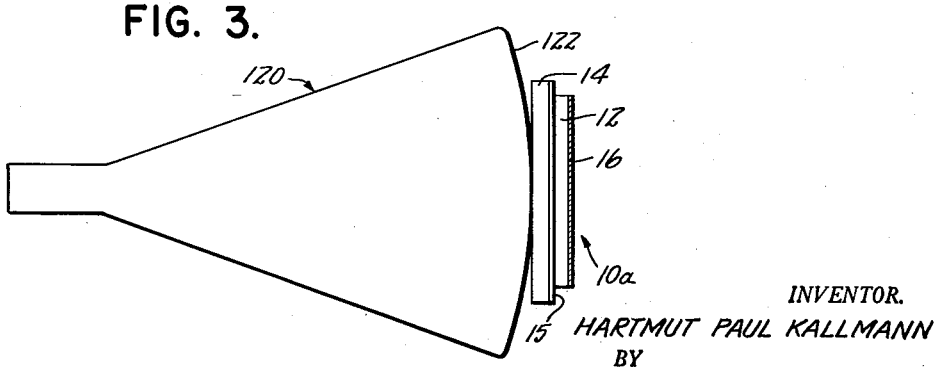
INVENTOR.
HARTMUT PAUL KALLMANN
BY
Curtis, Morris &Safford.
ATTORNEYS

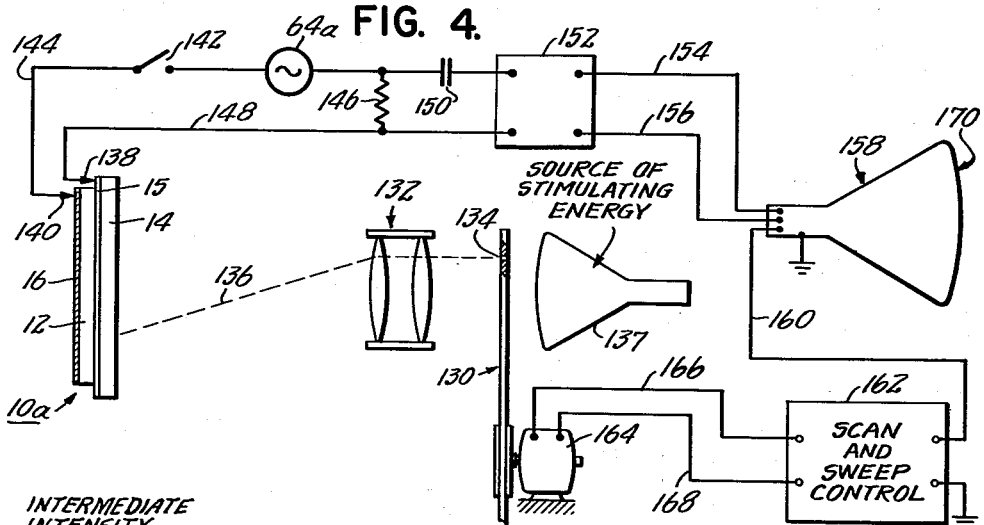
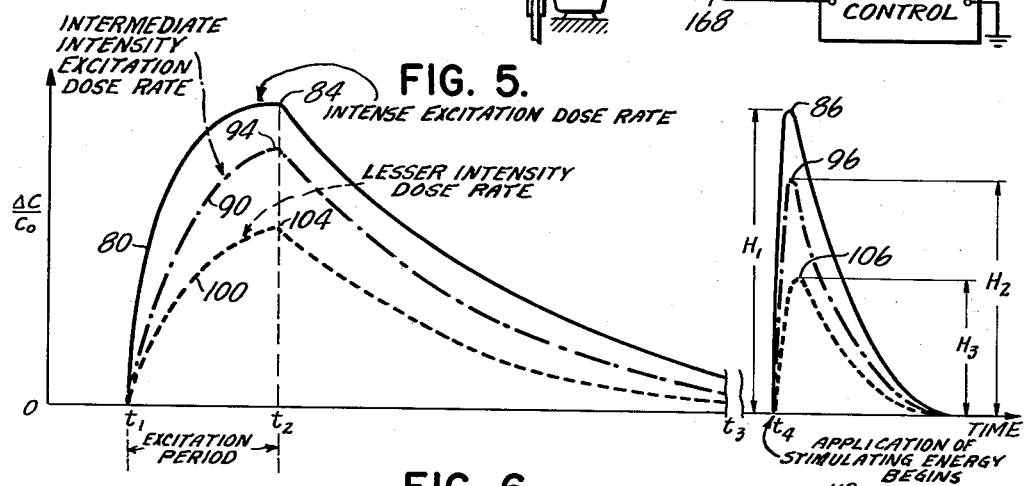
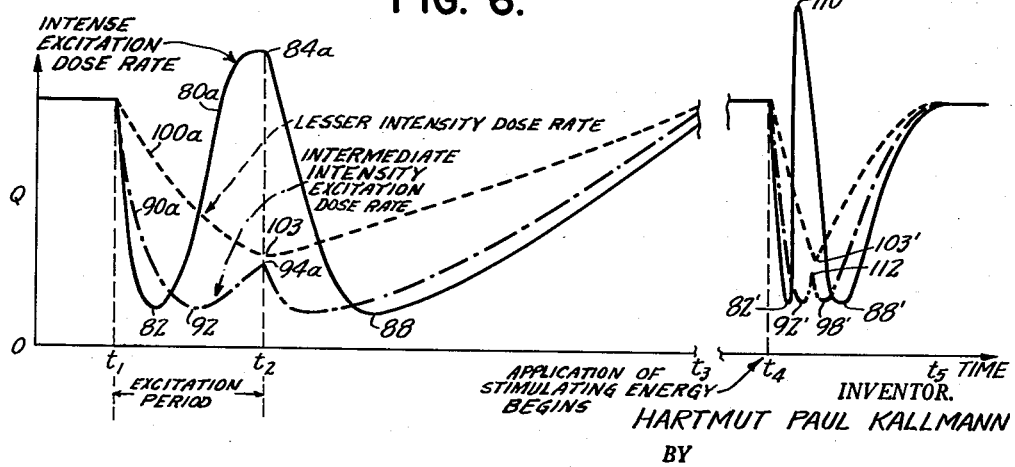

United States Patent Office 2,990,473
Patented June 27, 1961

2,990,473
METHOD FOR RECORDING, DETECTING AND MEASURING RADIATION AND FOR RECORDING AND RECALLING DATA
Hartmut Paul Kallmann, Flushing, N.Y., assignor to Research Corporation, New York, N.Y., a corporation of New York
Filed May 4, 1955, Ser. No. 505,881
16 Claims. (Cl. 250—71)

The present invention is in the field of recording, storing, and recalling data and recording, detecting and measuring radiation, method and apparatus utilizing changes in the electrical characteristics of certain classes of photoconductive materials resulting from stored latent photoconductivity.

This invention utilizes certain photoconductive materials which exhibit a substantial resistance in the absence of the application of exciting energy in some form and having internal trapping sites for the mobile charges which are created within the material as a result of suitably applied "excitation" energy.

The stored latent photoconductivity is initially induced in such photoconductive materials by applying "excitation" energy, which may be in the form of radiation, including but not limited to, visible light, ultra-violet, X-ray, and gamma, and which may be in the form of bombardment by charged particles, including but not limited to, alpha, beta, and cosmic particles. During this initial excitation, some or all of the electrical impedance characteristics of the material as measured during the application of an alternating electric field are found to vary. These variations may occur in the resistive part or in the capacitive part of the impedance, or in both, and may involve changes in the "Q" factor of the material, or various combinations of these characteristics may be involved, as explained below. These initial changes in impedance characteristics I explain by the theory that mobile charges are set free within the body of the material as a result of the initially applied excitation.

A period of time after the exciting energy has been removed, these impedance characteristics are observed to return of their original values. This return of the impedance characteristics to their values before radiation I explain by the theory that the mobile charges are removed from the conduction band, partly by recombination with charges of opposite sign and partly by becoming localized in random distribution in the internal trapping sites in the material.

The subsequent application of "stimulating" energy causes the reappearance of changes in there impedance characteristics. These subsequent changes in impedance characteristics, whatever characteristics they may be, are a function of the strength i.e. "dose" of the initial excitation. The amount of impedance change is an increasing function of the amount of energy absorbed in the material during the excitation. This reappearance of the impedance changes during stimulation following the excitation I explain by the theory that the charges which were localized in trapping sites are set free within the material so as to reappear as mobile charges therein. Where the material has not been subjected to exciting energy previous to the application of stimulating energy, the stimulating energy has substantially no effect.

The stimulation energy is desirably of a type which has a greater effect on the material in setting free trapped mobile charges than in creating new mobile charges, and preferably the stimulation energy has substantially little or no effect in creating new mobile charges.

The condition in the material following excitation and before stimulation, e.g., as explained here, the condition of having randomly distributed trapped charges is called "stored latent photoconductivity."

The present invention is particularly useful for information storage in the form of stored latent photoconductivity and for detecting, recording, and measuring various kinds of excitation energy, such as those enumerated above.

The stimulating energy described herein is of a wavelength which, in any event, is longer than that of the exciting energy applied during the original excitation; i.e., the stimulating energy has a smaller energy quantum than the exciting energy. For example, with many of the substances described hereinafter, the stimulating energy often used is infra-red which may desirably be in the range from about .06 to about 1.4 microns, but the particular wavelength used depends upon the particular stored latent photoconductivity material used and upon its temperature. By cooling the material, longer wavelengths often can be used for stimulation than are suitable at room temperatures. In certain substances the stimulating energy used may be of considerably shorter wavelength, for example such as green light or even ultra-violet light.

Among the advantages of the present invention when applied to information storage is that the data storage plates, which can be exposed in the manner of photographic plates, can be repeatedly used, the stored images being erased from the plates prior to each exposure.

An important advantage of using stored latent photoconductivity for data storage is that the storage process does not involve any net displacement of charge. Thus, no external electric field and no internal electric field is associated with the stored data. This absence of field enhances the stability of the stored data and makes the stored data less susceptible to external influences.

A further advantage of the present invention, for example, when compared with optical or light storage in the form of visible changes is that the stored information is much easier to read and measure. No sensitive optical devices are required. The measurement can be quickly made just using an impedance meter and a source of stimulation energy. Moreover, the methods and apparatus of the present invention enable the use of many storage substances entirely unsatisfactory for optical type devices. Many substances which show no or very little stimulated light emission, I find, show marked changes in impedance characteristics under the present methods and apparatus.

The resulting alternating current impedance charactertistic changes are readily amplified, further increasing the sensitivity of the systems disclosed.

Among the advantages of the present invention when applied to radiation detection and measurement is that the dose recording plates or dosimeter plates described herein which may readily be carried by persons being exposed to injurious radiation, are rugged in structure and sensitive and accurate in response, and they can be repeatedly used an indefinitely large number of times. These dose recording plates lend themselves to quick easy measurement of the dose to which the person has been exposed. There is no delay required for development of the plate, such as occurs with photographic film type devices.

A method which I have found particularly precise in yielding a measurement of the original "dose" or the magnitude of an item of data which has been recorded is to apply a suitable pre-stimulation energy to the material imediately prior to the application of the stimulation energy itself. The wave-length of the pre-stimulation energy I have found, must be longer than that of the stimulation energy, but the precise wave length of this energy and the amount used depends upon the relationship between the wavelength of the original excitation energy and that of the stimulation and upon the temperature of the material. For example, in certain instances it is highly desirable to pre-stimulate at a wavelength in the range from about 1.2 to about 1.3 microns and then to stimulate at a wavelength of about .6 or .7 microns.

My theory for explaining the effect of the pre-stimulation is that it sets free those mobile charges which were trapped in "shallow trapping sites" while leaving undisturbed all charges which were trapped in the "deep trapping sites." My theory is that any decay which may occur in the degree of the stored latent photoconductivity is due to the shallowly trapped charges, leaving predominantly only those which do not become set free over a period of time and which do not contribute to decay, regardless of the period which elapses between excitation and stimulation. Thus, the numbers of mobile charges which are set free from "deep traps" during stimulation and the consequent changes in impedance characteristics resulting therefrom are always an accurate indication of the absolute value of the magnitude of the data recorded. Where the measurement is for the purpose of determining the amount of energy to which a person has been exposed, then an accurate measurement of this dose is given regardless of the period elapsing since the exposure occurred.

Although in this specification and the accompanying drawings I have shown and described particular embodiments of the methods and apparatus of the present invention and have suggested various modifications thereof, it is to be understood that these are not intended to be exhaustive nor limiting of the invention, but on the contrary, are given for purpose of illustration in order that others skilled in the art may fully understand this invention and the principles thereof and the manner of applying the same in practical use and be enabled to modify and adapt it in various forms each as may be best suited to the conditions of a particular use.

In the drawings in which like reference numerals refer to like parts throughout and various parts or elements in various figures performing corresponding functions have corresponding reference numerals followed by appropriate distinguishing suffixes:

FIGURES 1A, 1B, and 1C illustrate various latent photoconductivity storage plates for use in method and apparatus embodying the present invention, suitable for use in measuring radiation and in systems of the data storage type or of the photographic type; FIGURE 1C shows such a plate being exposed for the purpose of measuring radiation, in accordance with method and apparatus embodying the present invention;

FIGURE 2 is a schematic circuit diagram of a capacitence measuring type bridge circuit applied to the measurement of the dose of radiation to which the dosimeter badge plate of FIGURE 1C has been exposed;

FIGURE 3 is a schematic diagram of the latent photoconductivity storage plate of FIGURE 1B being exposed to store data in accordance with an aspect of a method and apparatus embodying the present invention.

FIGURE 4 is a schematic diagram illustrating method and apparatus embodying the present invention for reading out any data which was stored in a latent photoconductivity storage plate or for determining the amount of exciting energy which has previously fallen on various parts of a plate, such as one of those in FIGURE 1A, 1B, or 1C; and FIGURES 5 and 6 are plots of certain impedance characteristics versus time, namely capacitance and "Q" for a sample of the stored photoconductivity material before, during, and after application of exciting energy and subsequent application of stimulating energy.

Shown in FIGURE 1A is a sensitive plate generally indicated at 10, suitable for use in a radiation dose recording badge or for storing information in the form of items of data, having a layer 12 including material capable of containing stored latent photoconductivity.

Where the layer 12 is mechanically self-supporting no backing is required. However, as a practical matter it is usually desirable to use a backing 14. Because the sensitive layer 12 is placed between electrodes for certain measurements, as described hereinafter, it is preferable to use an electrical conductive backing. Moreover, it is usually desirable to use a transparent electrode for transmitting the stimulating energy to the layer. For example, as shown the backing 14 is a glass which includes a conductive tin oxide glass layer 15 on the surface of the glass adjacent the sensitive material 12. To facilitate making external connections to the layer 15, the glass plate 14 and its coating 15 projects beyond the edges of the layer 12 at all points around the perimeter of the layer 12. In certain instances silver paint can be applied along the exposed edge of the conductive layer 15 as a terminal strip to aid in making contact therewith during the measurements described below. This stored latent photoconductivity layer 12 is selected from a class of photoconductive materials having the following common characteristics. These photoconductive materials suitable for use have a substantial "dark" resistance, i.e. in the absence of any applied excitation insignificant amounts of mobile charges are present in the body of the material and substantially no mobile charges are created in the material excluding whatever small amounts may be present as a result of cosmic radiation. The material in the layer 12 has trapping sites therein for trapping and retaining for long periods of time internally the mobile charges set free in the layer as a result of the excitation energy applied.

Preferably, the material in the layer 12 has a substantially high "Q," in the presence of an alternating electric field under the conditions of measurement, that is, that the electric field energy in the material in the layer 12 during each cycle of an applied alternating electric field is at least about 10 times the electric field energy dissipated in the material during each cycle.

Examples of photoconductive materials which are within this stored latent photoconductivity class are:

Zinc-cadmium sulphides (ZnS—CdS)
Zinc-cadmium selenides (ZnSe—CdSe)
Zinc-cadmium tellurides (ZnTe—CdTe
Zinc sulphide (ZnS)
Cadmium sulphide (CdS)
Zinc selenide (ZnSe)
Cadmium selenide (CdSe)
Zinc telluride (ZnTe)
Cadmium telluride (CdTe)
Zinc oxide (ZnO)

These materials should be activated in ways identical to the activation carried out in making these same materials luminescent, that is, by the addition of small amounts of activating materials. These activating materials can, in certain instances, be free atoms of zinc or cadmium.

A highly suitable dose recording plate for use in a dosimeter badge or for use as a data storage plate is made by using zinc-cadmium sulphide powder, for example, having a composition as follows:

| Element: | Percent by weight |
|---|---|
| Zinc | 38 |
| Cadmium | 32 |
| Magnesium | 0.27 |
| Silver | 0.0005 |
| Silicon | 0.002 |
| Iron | 0.003 |
| Copper | 0.008 |
| Titanium | 0.003 |
| Sulphur | Balance |

The presence of the silver, copper, and iron, I find to be desirable as activators in the material.

The plate 10a in FIGURE 1B is identical with the plate 10 except that both faces of the sensitive layer 12 are covered by electrodes. The electrode 16 is a thin sheet of aluminum foil pressed firmly against the sensitive layer.

This sensitive layer material is dispersed in a mixture of transparent adhesive, e.g. such as "Duco" cement and amyl acetate and then spread on and dried in a thin layer 12 on a supporting sheet for example such as the supporting layers shown in FIGURES 1A, 1B, and 1C. The layer 12 preferably has a thickness in the range from about .04 millimeter to about 1 millimeter, and a medium thickness of $\frac{1}{10}$ mm. is usually quite satisfactory.

The plate 10b in FIGURE 1C includes a sensitive layer 12 sandwiched between two transparent electrodes formed by sheets of glass 14 and 17 coated on their inner surfaces by very thin transparent layers 15 and 19 of metal, for example such as gold, silver, or aluminum, or alternatively, tin-oxide glass coatings may be used for these layers 15 and 19.

A suitable way of preparing the layer 12 in the plate 10b is to spread the latent photoconductivity storage material in powder form on one of the electrodes and then add a matrix medium of a relatively low melting point liquid, for example such as paraffin wax or castor wax. The amount of this matrix medium used is only sufficient to fill up the interstices between the grains of the storage material to make the layer 12 homogeneous and with the air entirely excluded when the other electrode is pressed down firmly against the layer 12. Among the advantages of using the castor wax are its high dielectric constant and transparency to exciting and stimulating energy. As the electrodes are pressed against opposite sides of the layer 12, the matrix medium is allowed to solidify.

Among the advantages of the plates 10 and 10b is that the sensitive layer 12 is equally responsive to radiation from either direction. With the plate 10a the exciting or stimulating energy is applied through the transparent electrode.

As shown in FIGURE 1C the plate 10b is being exposed to exciting energy 20 from an exciting source 21. For example, as here shown the source 21 includes radio-active material giving off gamma radiation 20 which excites the layer 12 in the plate 10b.

The sensitive plate 10, 10a, or 10b, as the case may be, may be mounted in a siutable cardboard holder or other holder (not shown) arranged to be worn as a badge. In this way it is suitably shielded from unwanted radiation, such as visible light. The sensitive plate itself may be one or a few square inches in area.

At the end of a work period the badge is turned in and the stored photoconductivity of the sensitive plate 10, 10a, or 10b is measured in the circuit of FIGURE 2 to determine the amount of radiation to which the person who wore it was exposed. In general, the greater the amount of stored latent photoconductivity, the greater was the original dose of exciting energy, as explained in detail hereinafter.

As shown in FIGURE 2 during measurement, electrical contact with an external circuit is made by engaging the electrodes 15 and 19 with a pair of contact 22 and 24. A pair of leads 26 and 28, respectively, extend from these contacts to a pair of switches 30 and 32 adapted to connect the electrodes 15 and 19 into a bridge circuit, generally indicated at 34. The purpose of this bridge circuit is to measure changes in the impedance characteristics of the latent photoconductivity storage layer 12 between the electrodes.

As used herein the expression "changes in the impedance characteristics" or similar expression is intended to include changes in capacitance, resistance, inductance, and Q as well as changes in their ratios and in various complex quantities including one or more of them. For certain purposes it is desirable to use capacitance measurements, in which case, the bridge circuit 34 may advantageously be used for measuring capacitance changes in layer 12. It has a first branch 35 and a second branch 36 extending between the output terminals 38 and 40. The first branch includes a fixed condenser 42 shunted by a variable resistor 44 and in series with the pair of leads 45 and 46 connected through the switches 30 and 32, respectively, to the leads 26 and 28. The second branch 36 includes a variable condenser 48 shunted by a fixed resistor 50 and in series with a variable condenser 52. Included in the branches 35 and 36 are energizing terminals 54 and 56, respectively, with a coil 60 therebetween and coupled to a coil 62 being fed by an oscillator 64. Across the output terminals 38 and 40 is connected a measuring circuit 65 including a null detector 66.

When the sensitive layer 12 has one or both faces uncovered by an electrode, for example, as in the plate 10 shown in FIGURE 1A, then during the use of the measuring circuit of FIGURE 2 the uncovered surface of the layer 12 is pressed firmly against an electrode designed to make intimate contact therewith. During measurement in the circuit of FIGURE 2, the plate whose characteristics are being measured is irradiated by suitable stimulating energy 70 from a source 72 having a control 74 adapted to turn the source 72 on and off. Means (not shown) may be provided for adjusting the intensity of the stimulating radiation 70, where desired. The measuring switches 30 and 32 are closed. For purposes of example, it is assumed that it is the capacitance characteristics of the layer 12 being sensed in order to determine the original dose of exciting energy.

In order to explain the operation of the measuring circuit of FIGURE 2 attention is now directed to the plot in FIGURE 5. The solidly drawn curve 80 represents the value of relative capacitance change $\Delta C/C_0$. This is the ratio between the change $\Delta C$ in capacitance and the original capacitance $C_0$ prior to any excitation, i.e. when completely "quenched" so as to be substantially completely free of all stored latent photoconductivity. "Quenching" is obtained by prolonged application of stimulating energy in the absence of any exciting energy. Line 80 represents the value of relative capacitance change of the layer 12 when it is continuously measured in the circuit of FIGURE 2 while being exposed to the exciting radiation 20 and then, after a rest period with no energy applied, is uniformly exposed to the stimulating radiation from a suitable source of stimulating energy, which by way of example is shown as a controllable infra-red source 72.

The formula for $\Delta C/C_0$ is expressed as:

(1) $$\frac{\Delta C}{C_0} = \frac{C(t) - C_0}{C_0}$$

This ratio is a very convenient measurement to use in many cases.

In FIGURE 5 the curve 80, which represents the capacitance characteristics of typical material in the above class under high excitation conditions, is initially zero. At time $t_1$ an intense exciting radiation 20 begins to be applied, and progressively more mobile charges are set free within the body of the material. The presence of these increasing numbers of mobile charges, which can be displaced by the applied alternating electric field due to the oscillator 64, provides displacement conduction current and causes the measured capacitance to increase. The total impedance, not shown, will correspondingly drop. The reason which is ascribed to this behavior of the capacitance is discussed in The Physical Review, Vol. 89, No. 4, pages 700–707, February 15, 1953. As shown the curve of the relative increase in capacitance rises up to a point 84 during application of the exciting energy, called herein the "excitation period," or simply "excitation."

At time $t_2$ the exciting energy is turned off, and the capacitance drops from its value at 84 and asymptotically approaches its initial value at some later time $t_3$, as the number of mobile charges in layer 12 decays because of recombination of the mobile charges of the opposite sign and because of trapping of the mobile charges in the trapping sites.

Between $t_1$ and $t_2$ the capacitance value plotted begins by rising rapidly, but the rate of rise gradually decreases as the number of mobile charges approaches toward a saturation value, due to the intense dose of exciting energy which is being applied. The amount of exciting energy applied between $t_1$ and $t_2$ is assumed to be approximately that amount required for saturation of layer 12, and thus the curve 80 becomes almost horizontal before reaching time $t_2$.

At time $t_4$, an indefinite period after $t_2$, when the capacitance value has or has not yet returned to its initial value, then suitable stimulating energy is applied. Where a long period of time, i.e. several hours, has elapsed after excitation before the stimulating energy is applied, then the capacitance value will have returned to its initial value.

As mentioned above, the stimulating energy, in any event, has a smaller energy quantum than the exciting energy (i.e. longer wavelength), but the particular wavelength used depends on the particular latent photoconductivity storage material being used and upon its temperature. When the material used is one of those specifically listed above, then the stimulating energy which often is used with the method and apparatus presently being described is infra-red with a wavelength in the range from about .6 to about 1.4 microns.

The intensity of the stimulating energy 70 should be sufficiently low to yield a fairly slow rise in the curve 80 after time $t_4$ so that the maximum point 86 can conveniently be measured by the bridge circuit 34. The method of the present invention is intended to include the use of more intense bursts of stimulating energy 70 where faster means are used to determine the value of the peak 86 occurring when stimulation occurs.

The source 72 may be a monochromator or suitable Corning glass filters may be used with incandescent tungsten to provide the desired wavelength. This stimulating energy, according to the theory of explanation offered herein, frees the trapped charges. In other words, the photoconductivity which was originally created by the excitation between $t_1$ and $t_2$, and which was stored therein in latent form by trapping of large numbers of the resultant mobile charges, is now simulated and reappears as a sudden rise to a point 86 in capacitance soon after time $t_4$. Thereafter, the number of mobile charges again decays until at $t_5$ the initial capacitance value is again reached.

The rate of decay from point 86 depends, among other things, upon whether or not the stimulating energy 70 continues to be applied after the peak is reached.

The magnitude of the capacitance rise $H_1$ after time $t_4$ is a direct indication of the radiation dose applied between $t_1$ and $t_2$, which, for instance can be determined by calibration, or sometimes by calculation. Thus, to measure the amount of radiation to which a person wearing the plate 10 in FIGURE 1 has been exposed, the capacitance rise which occurs when the stimulating energy from the source 72 is applied is measured by noting the magnitude of the changes in the impedance characteristics being measured.

Preferably, for greater sensitivity the frequency of the alternating electric field applied through the layer 12 is as low as possible, being limited by the "Q" value of the sensitive material (which should not be too low at the measuring frequency) and being limited by the speed of measurement desired in measuring the stimulated impedance characteristic changes. Among the many advantages of the methods and apparatus described herein is the fact that the voltage of the applied electric field used during measurement can be very low. For example, in FIGURE 2 the alternating voltage applied to the layer 12 by the electrodes 15 and 19 may have a root mean square value as low as ½ volt and still provide very satisfactory measurement. The oscillator 64 is of relatively low frequency, e.g. such as from 10 to about 60 c.p.s. However, frequencies up to a million c.p.s. and more can readily be used for this measurement. The higher frequencies are used where the scanning rate is high, as discussed below. Also, because of the fact that a relatively high Q is desirable during measurement, with more lossy materials, e.g. lower resistance materials, a correspondingly higher oscillator frequency is used to reduce the loss per cycle and thus to obtain a higher Q.

In FIGURE 5 the dash and dot curve 90 illustrates the capacitance change in a stored latent photoconductivity layer, for example, such as the layer 12 when the exciting energy exposure between $t_1$ and $t_2$ is less intense and lasts approximately the same period of time as before. The capacitance rises slower and to a lower value 94. When the stimulating energy is applied at time $t_4$, the capacitance rise $H_2$ to the point 96 is correspondingly less.

In FIGURE 5 the dotted curve 100 represents the condition when even less excitating energy is applied between $t_1$ and $t_2$, so that the capacitance rises to a still lower value 104. Correspondingly, during stimulation begun at time $t_4$ the capacitance rise $H_3$ to point 106 is less, showing that less stored latent photoconductivity existed in layer 12.

The "Q" factor, defined as the ratio between the electric field energy per cycle in the layer 12 and the energy dissipated per cycle in this layer, behaves entirely differently from the capacitance. The curve 80a in FIGURE 6 shows "Q" vs. time for conditions corresponding to those for curve 80 in FIGURE 5.

Where the dose is a large one, as is indicated with the curve 80a, Q passes through a minimum 82 and begins rising back up toward, and often above, its initial value to a point 84a at time $t_2$.

Then, as the conductivity decays between $t_2$ and $t_3$ the curve 80a passes down again through a minimum 88 before rising back to its initial value at some time during the period $t_3$.

At the time $t_4$, indefinitely later than $t_2$, the stimulating energy is applied to the portion of the layer 12 under consideration, the Q value very quickly passes through a minimum value 82' corresponding roughly with the value 82, and then rises up to a point 110, at which time stimulation is stopped. During the subsequent decay the Q again passes through another corresponding minimum value 88', which is roughly the same minimum value as appeared at 88.

The dashed and dotted curve 90a of "Q" corresponds to the curve 90 resulting from an intermediate intensity of exciting energy having minimum values at 92, 98, 92' and 98'. This curve passes through a minimum 92' rises to a point 112, at which time stimulation ceases.

The intensity of the exciting energy during the time $t_1$ to $t_2$ for the curve 100a, corresponding to curve 100, was fairly low so that "Q" does not pass through a minimum value, but continues down to a point 103 at $t_2$. Consequently, during stimulation the curve 100a drops to a corresponding point 103'.

In order to measure capacitance or "Q," as shown in FIGURE 2, any satisfactory kind of null detector 66 can be used, such as a sensitive galvanometer. Also, where "Q" measurements alone are desired, the leads 26 and 28 can be directly connected to a conventional "Q" meter instead of using the bridge circuit 34.

This "Q" measurement is advantageous for it gives a quick indication of whether the dose to which the plate 10b was subjected, was above or below a certain predetermined value, which can be calibrated, or sometimes, calculated. When the dose was above this predetermined value, then a minimum appears during stimulation and the Q rises again after the minimum, as occurs with the curves 80a and 90a. When the dose is below this predetermined value, then there is no minimum, but the curve continues to drop until the stimulation ceases, e.g.

the curve 100a falls steadily to the point 103', when stimulation ceases.

This Q measurement is a quick, convenient way of determing whether a person has been subjected to a dose of radiation above a predetermined level.

Among the further advantages of the Q measurement is the fact that where very small doses are to be detected, it often is much more sensitive to use the Q measurement instead of $\Delta C/C_0$ because the Q value is observed to drop very abruptly even where very small amounts of stored latent photoconductivity are involved.

Where the total amount of stimulating energy applied is held to a relatively low value during a measurement, then advantageously it is possible to repeat the dose measurement at a later period of time. For example, this might be done for purposes of checking the original measurements or for some other control purpose. As many as ten stimulating measurements have been made in accordance with the methods described herein at successively later periods of time on a sensitive plate which was excited only once prior to any stimulation.

Any stimulating energy may also serve to "quench" all of the latent photoconductivity stored in the layer 12 so that the plate 10 can be used again in a dosimeter badge, depending upon the amount of stimulating energy applied. Where complete "quenching" of the sensitive material occurs during any measurement, then subsequent stimulating measurements, as discussed immediately above cannot, of course, be made. This I explain by the theory that "quenching" sets free all of the trapped charges and they become neutralized; thus further stimulation has no effect until the sensitive material is again excited.

A radiation dose plate as described herein can be repeatedly used many thousands of times at least.

In order to prevent light from "fogging" the plate 10, it is preferably covered in the badge by a shield of light-opaque material which is transparent to the radiation to be measured. Both the Q measurement and a capacitance or other impedance characteristic measurement can be made simultaneously, where desired, as a check on each other.

Illustrated in FIGURE 3 is a data storage plate being exposed for the purpose of storing data in the form of individual bits of information in various areas of the sensitive material. As illustrated the data storage plate includes a sensitive layer 12, for example, such as that used in any one of the plates 10, 10a, or 10b. The plate 10a is shown as having its transparent electrode pressed against the face of a suitable cathode ray tube 120. Various regions of the data storage plate are subjected to different degrees of excitation depending upon the amount of exciting energy from the various areas of the tube face 122 adjacent thereto. The tube 120 may be controlled in any suitable way to produce these various amounts of excitation in various areas of the plate which correspond to various bits of information to be stored in the different parts of the storage plate. The control arrangements shown in my copending joint application Serial No. 487,889, filed February 14, 1955, with Barnett Rosenberg as coinventor may be used.

In certain instances it may be advantageous to divide the layer 12 into a plurality of individual data storage elemental portions by means of a lattice of insulating spacer strips, for example, as shown in the above copending application.

With a suitable lens system a plate such as 10, 10a, or 10b can be used for ordinary photography, the image being stored in the form of latent photo-conductivity. In order to read out the data from the plate 10a at a subsequent period of time or to develop a photographic image latent therein, the method and apparatus of FIGURE 4 may be used, including a scanning disc 130 and a lens system 132. The disc 130 has a spiral row of small holes 134 near its edge and is of sufficient diameter that these holes scan a beam 136 of stimulating energy, for example such as infra-red from a source 137 across successively lower horizontal strips of the plate 10a which is now positioned so that the electrodes 15 and 16 make contact with a pair of contacts 138 and 140, respectively, and has its transparent electrode facing the disc 130.

As the beam 136 strikes each elemental area of the layer 12 which was originally excited by being exposed to exciting energy, the stored latent photo-conductivity therein is released, causing a sudden change in the impedance characteristics between the plates 15 and 16. An alternating electric field is applied from a source 64a through a switch 142 and a lead 144 to the contact 140 and through a resistor 146 and a lead 148 to the contact 138. This field may be as low as ½ a volt. The frequency of the oscillator 64a is as low as possible, being limited by the factors discussed above in connection with the oscillator 64 in FIGURE 2. Also, in any event, the applied electric field between the electrodes 15 and 16 must be higher than the frequency of scanning of the beam 136 across each strip of the layer 12.

The circuit shown in FIGURE 4 is arranged to use the change in impedance between the electrodes 14 and 15. Thus, whenever an elemental area of the layer 12 which is being stimulated by the beam 136 is one that was previously excited, there is a sudden drop in impedance. A corresponding jump in the alternating current through the resistor 146 occurs, and the resultant alternating voltage pulse is coupled through a condenser 150 to an alternating current amplifier 152. The amplifier 152 is desirably tuned to the frequency of the source 64a. The amplifier output is fed through a pair of leads 154 and 156 to a suitable display circuit, for example, as shown here it is a dark trace tube 158.

Among the advantages of the present method is that it enables the use of tuned alternating current amplifiers to be used and enables such low electric fields to be applied across the layer 12.

In order to control the sweep of the scanning beam within the dark trace tube 158, a control terminal of this tube is connected through a lead 160 to the output of a scanning and sweep control circuit 162 which also controls the speed of a synchronous motor 164 connected by leads 166 and 168 to another pair of output terminals of the control circuit 162. The hub of the scanning disc 130 is mounted on the shaft of this motor.

As shown in FIGURE 4 the scanning of the various areas of the latent photoconductivity storage layer 12 is carried out by means of a scanning disc. A cathode-ray tube arranged to produce suitable stimulating energy from sequential areas on its face can also be used for scanning the various areas of the layer 12 for recalling items of data stored therein or for "developing" various elemental areas of a photograph latent therein. For data recording and recall, elemental area by elemental area scanning is used and scanning methods or apparatus such as shown in FIGURES 3 and 4 have advantages in use, but in certain instances other scanning methods and apparatus may be used. In each case, during the recall of bits of stored data or during the "development" of elemental areas of a photograph the stored latent photoconductivity in the various elemental areas of the layer 12 is sensed area by area while the area by area scanning occurs. Where isolation of the sensing of the alternating electric field characteristics of each elemental area is desired, then individual isolated electrodes and individual circuits may be used for each elemental area or region of the layer 12, for example, as shown and claimed in the above copending application.

Among the further advantages of the present method and apparatus is that it enables infra-red photographs to be made with long wavelengths, for example, such as down to 1.4 microns, i.e. considerably below the lowest frequency possible with the best infra-red film today. The plate 10, 10a, or 10b, as the case may be, is first uniformly excited, for example with ultra-violet or with visible light. Then, in taking the photograph various areas of the plate are exposed to the desired infra-red, which acts as stimulating energy, and thus acts to set free the latent photoconductivity stored in the exposed areas to a greater or lesser degree, depending upon the particular intensity of the exposure of each exposed area of the image being photographed. The unexposed areas retain substantially their full initial latent photoconductivity. The exposed plate, in effect, bears a negative image. It is developed as shown in FIGURE 4. The resulting display on the face 170 of the tube 158 may be photographed for permanent recording of the original data from the exposure in FIGURE 3 or of the photographed material, as the case may be.

Among the advantages of this data storage and photography system are those resulting from the extreme sensitivity of the plate and the amplification which is obtained by the stimulation scanning with amplified output.

Referring again to FIGURES 5 and 6, immediately before $t_4$ I prefer in many cases to use pre-stimulation. For example, this pre-stimulation may last for 30 seconds and have an intensity in the range from about 100 to about 2,000 microwatts per square cm. at about 1.2 or 1.3 microns. Then the stimulation is for about 1 second or less with an intensity of from about 100 to about 2,000 microwatts per square cm. at about .6 or .7 microns.

This pre-stimulation may also be used to advantage in the infra-red photography discussed above when the light being photographed is near .7 microns. Before taking the picture (and after excitation) the plate is exposed to pre-stimulating energy of a wavelength in the range from about 1.2 to 1.3 microns to wipe out the shallowly trapped charges. This prevents decay in the photographed image.

Pre-stimulation can usually be used to advantage with any of the above method and apparatus to remove the factor or factors causing decay in the stored latent conductivity prior to application of the stimulating energy.

From the foregoing it will be understood that the embodiments of the present invention described above are well suited to provide the advantages set forth, and since many possible embodiments may be made of the various features of this invention and as the methods herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, or without departing from the scope of the invention.

What is claimed is:

1. The method of obtaining at a subsequent time measurements of doses of exciting energy radiation which have occurred at a previous time comprising the steps of exposing latent photoconductivity storage material to said exciting energy radiation, protecting said material from further significant excitation for a period of time thereafter while maintaining said material at room temperature, and then at a time subsequent to said exposure to exciting energy applying stimulating energy radiation to the material while simultaneously measuring at least one electrical characteristic of said material in the presence of an alternating electric field, the stimulating energy having longer wavelength than said exciting energy.

2. The method as claimed in claim 1 wherein the measured electrical characteristic of said material is its alternating current impedance.

3. The method as claimed in claim 2 wherein the alternating current impedance is measured in the frequency range from about 10 to about one million c.p.s.

4. The method as claimed in claim 1 wherein the measured electrical characteristic of said material is its Q.

5. The method as claimed in claim 4 wherein the Q of said material is measured at a frequency lying in the range from about 10 to about one million c.p.s.

6. The method of measuring at a second period of time doses of exciting energy radiation which have occurred at a previous first period of time comprising the steps of exposing latent photoconductivity material to said exciting energy radiation during a first period of time, thereafter during the second period of time applying stimulating energy to said material while measuring the effective capacitance characteristics of said material in the presence of an alternating electric field, the stimulating energy having smaller energy quanta than said exciting energy radiation.

7. The method of obtaining measurements during a subsequent time period of the magnitude of doses of exciting energy which have occurred during a first time period comprising the steps of exposing to said exciting energy sensitive material having the characteristic of stored latent photoconductivity, thereafter as a second step during a second time period applying pre-stimulating energy to said material having wavelength longer than the exciting energy, thereafter as a third step during a subsequent time period applying stimulating energy to said material while as a fourth step occurring with said third step during said subsequent time period applying an alternating electric field to said material and as a fifth step occurring with said third and fourth steps during said subsequent time period sensing the impedance characteristic changes of said material during said application of stimulating energy, and wherein said stimulating energy has a wavelength intermediate those of said exciting and pre-stimulating energies.

8. The method as claimed in claim 7 wherein said pre-stimulating energy has a wavelength in the range from about 1.2 to about 1.3 microns and wherein said stimulating energy has a wavelength in the range from about .6 to about .7 microns.

9. The method of obtaining at a subsequent period of time an indication of the total dosage of exciting radiation which has impinged on an object during a first prior period of time comprising the steps of subjecting latent photoconductivity storage material to the same radiation as the object during a first period of time, thereafter protecting said material from further excitation for a second period of time at room temperature, and then during a subsequent period of time stimulating said material with infra-red radiation having a wavelength in the range from about 0.6 to about 1.4 microns and simultaneously measuring an electrical characteristic of said material during said stimulating stimulation, said electrical characteristic being selected from the group consisting of resistance, capacitance, impedance, and "Q" factor.

10. The method of determining at a later period of time the magnitude of exciting energy radiation doses which have occurred during an earlier period of time comprising the steps of exposing during a first period of time to the exciting energy radiation to be measured a portion of material selected from the class of materials consisting of zinc-cadmium sulphide, zinc-cadmium selenide, zinc-cadmium telluride, each of these in any ratio of zinc to cadmium up to 100% of either one relative to the other, and ZnO, these materials including small amounts of activating agents; then during a second time period subsequent to said first time period protecting said portion from further excitation; and finally during a third time period later than said second time period subjecting said portion to an alternating electric field while simultaneously stimulating said portion by energy having a wavelength longer than said exciting energy and simultaneously measuring the electrical "Q" characteristics of said portion in the presence of said alternating electric field.

11. The method of storing information during a first time period and at a later time period of recalling said stored information during a subsequent second time period comprising the steps of exposing during the first time period to exciting energy latent photoconductivity storage material having a substantially high dark resistance and having trapping sites therein for internal mobile charges; then during a second intermediate time period shielding said material from any further significant excitation; and finally during a third time period subsequent to said second period measuring the electrical impedance characteristics of said material, in the presence of an alternating electric field, while simultaneously stimulating said material by applying stimulating energy thereto during said third period, said stimulating energy having longer wavelength than said exciting energy.

12. The method of storing data during a first time span in the form of variations in stored latent photoconductivity and of recalling the store data during a later time span comprising the steps of exposing during a first time span a plurality of regions each including latent photoconductivity storage material to exciting energy having characteristics corresponding to the information to be stored; then during a subsequent time span shielding said regions from further exciting energy; and during a still later time span carrying out the three steps of applying stimulating energy to each of said regions in a predetermined sequence, applying alternating electrical fields to said regions, and sensing the changes in capacitance of each of said regions in said sequence as said stimulating energy is applied thereto.

13. The method of determining at a later time period the total amount of dosage of energy radiation having a wavelength shorter than about .6 microns which occurred during a previous period comprising the steps of exposing latent photoconductivity storage material to the energy radiation during the dosage, said material having substantial dark resistance, having trapping sites therein for mobile charges, and having a Q of at least 10 in an alternating electric field at least at one frequency in the range from about 10 to about one million cycles per second, and then at a later time period applying infra-red stimulating energy to said material while simultaneously subjecting it to an alternating electric field of a frequency in said range, said stimulating energy having a wavelength in the range from about .6 to about 1.4 microns, and sensing the Q of said material during said later time period.

14. The method of making infra-red photographs with infra-red light having a wavelength as long as about 1.4 microns comprising the steps of uniformly exciting a sensitive layer including latent photoconductivity storage material by means of exciting energy having a wavelength shorter than about .6 microns; thereafter at a subsequent time exposing said layer to the infra-red light image to be photographed; then at a still later time developing the image by applying to successive elemental areas of said layer stimulating energy having a wavelength in the range from about .6 to about 1.4 microns while sensing the alternating electric field characteristics of said successive elemental areas of said layer as said stimulating energy is applied.

15. The method of recording and recalling data by means of stored latent photoconductivity comprising the steps of uniformly exciting a sensitive layer including latent photoconductivity storage material by means of exciting energy having a wavelength shorter than about .6 microns; thereafter at a later time exposing various elemental areas of said sensitive layer to infra-red light having characteristics corresponding to data to be stored in said elemental areas; and thereafter at a still later time recalling the stored data by applying to said various elemental areas of said layer stimulating energy having a wavelength in the range from about .6 to about 1.4 microns while sensing the electric field characteristics of said various elemental areas as said stimulating energy is applied.

16. The method of making infra-red photographs by means of light having a wavelength shorter than about 1.0 microns, comprising the steps of uniformly exciting a sensitive layer including latent photoconductivity storage material by means of exciting energy having a wavelength shorter than about .6 microns; thereafter at a later time pre-stimulating said layer by irradiating with infra-red light having a wavelength of about 1.3 microns; then at a still later time exposing said layer to the light to be photographed; and finally developing the image by applying to said layer stimulating energy having a wavelength shorter than the pre-stimulating energy but longer than the wavelength of the exciting energy, while sensing the alternating electric field characteristics of various elemental areas of said layer as said stimulating energy is applied.

References Cited in the file of this patent

UNITED STATES PATENTS

| Number | Name | Date |
|---|---|---|
| 2,207,217 | Fodor | July 9, 1940 |
| 2,239,887 | Ferrant | Apr. 29, 1941 |
| 2,243,828 | Leverenz | May 27, 1941 |
| 2,297,691 | Carlson | Oct. 6, 1942 |
| 2,546,160 | Lengyel | Mar. 27, 1951 |
| 2,551,650 | Urbach | May 8, 1951 |
| 2,562,969 | Teichmann | Aug. 7, 1951 |
| 2,566,349 | Mager | Sept. 4, 1951 |
| 2,706,792 | Jacobs | Apr. 19, 1955 |
| 2,730,625 | Shurcliff | Jan. 10, 1956 |
| 2,730,644 | Michlin | Jan. 10, 1956 |
| 2,780,731 | Miller | Feb. 5, 1957 |
| 2,834,891 | Ravich | May 13, 1958 |